United States Patent [19]

Baumann et al.

[11] Patent Number: 5,263,826
[45] Date of Patent: Nov. 23, 1993

[54] DEVICE FOR REFUELING A GASEOUS FUEL TANK

[75] Inventors: Heinz Baumann; Heinz Mutter, both of Winterthur, Switzerland

[73] Assignee: Sulzer Brothers Limited, Winterthur, Switzerland

[21] Appl. No.: 858,736

[22] Filed: Mar. 27, 1992

[30] Foreign Application Priority Data

May 30, 1991 [CH] Switzerland .................. 1593/91

[51] Int. Cl.⁵ ............................................. F04B 49/00
[52] U.S. Cl. ................................. 417/310; 417/423.14
[58] Field of Search ............... 417/307, 308, 309, 310, 417/440, 423.3, 423.7, 423.12, 423.14, 424.1, 424.2

[56] References Cited

U.S. PATENT DOCUMENTS

| | | | |
|---|---|---|---|
| 2,136,959 | 11/1938 | Winfield | 417/308 |
| 4,700,680 | 10/1987 | Pearce | 417/310 |
| 4,966,206 | 10/1990 | Baumann et al. | 137/79 |
| 5,029,622 | 7/1991 | Mutter | 137/79 |

Primary Examiner—Richard A. Bertsch
Assistant Examiner—Alfred Basichas
Attorney, Agent, or Firm—Townsend and Townsend Khourie and Crew

[57] ABSTRACT

A compressor (1) can be connected on the suction side via a suction line (7) provided with an inlet valve (16) to a natural gas line (9) and on the pressure side via an intake line (12) to the gas fuel tank (13) and is also connected via a relief line (10) to a relief valve (11) and a pressure control valve. (25), with said valves being disposed in a pressurized tank (4). This tank is connected to the suction side of the compressor (1) and the outlet sides of the inlet valve (16) and of the relief valve (11) and also with an outlet line (18) via a safety valve (20), which can be set at a predetermined opening pressure of 2 to 3 bar, for example. The pressurized tank (4), is designed with a cover (5) constructed as a support part, on which the compressor (1) is mounted. The compressor (1) can be coupled via a vertical drive shaft (2) with a motor (3) disposed inside the pressurized tank (4). This arrangement permits a simple design of the pressurized tank (4) and a compact construction of the appliance, which is particularly intended for refueling motor vehicles.

20 Claims, 3 Drawing Sheets

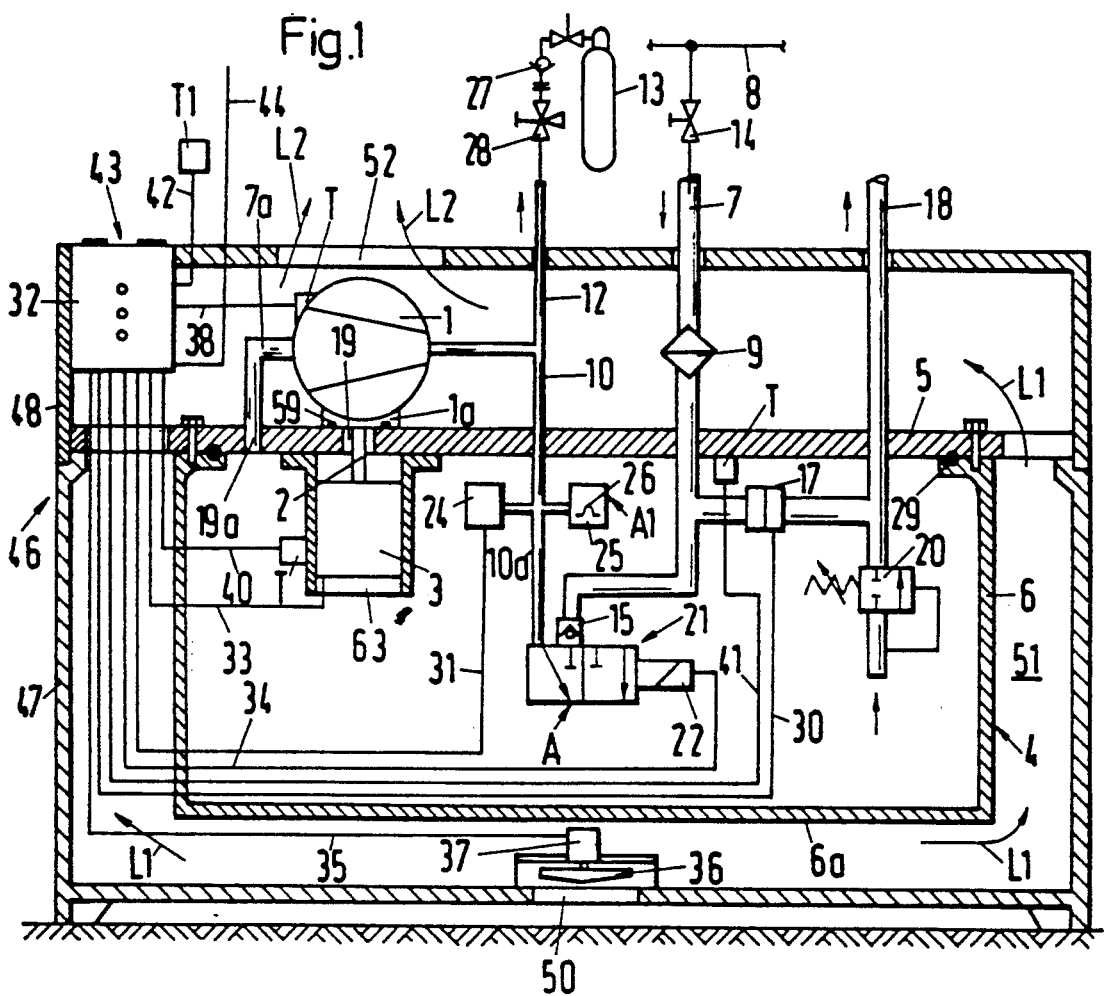
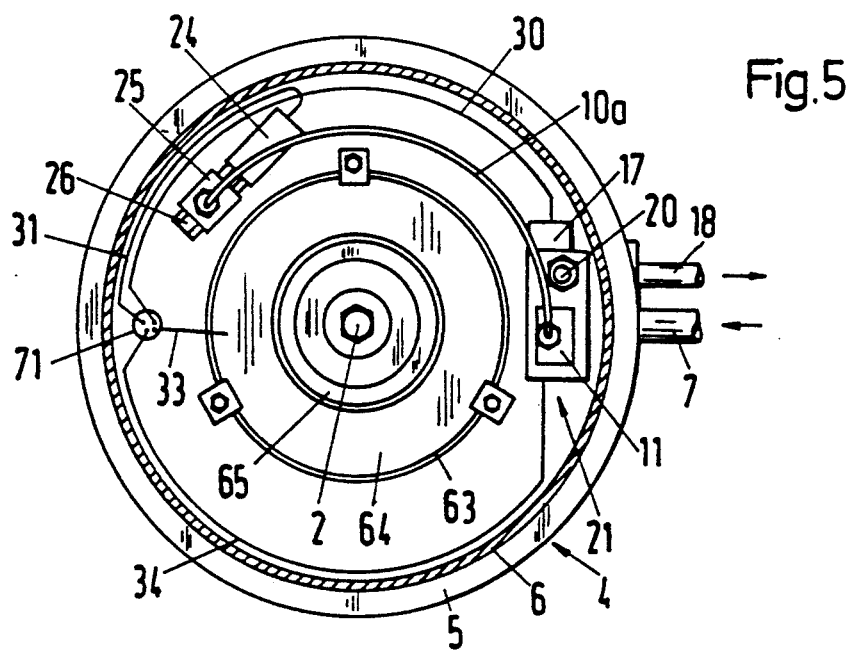

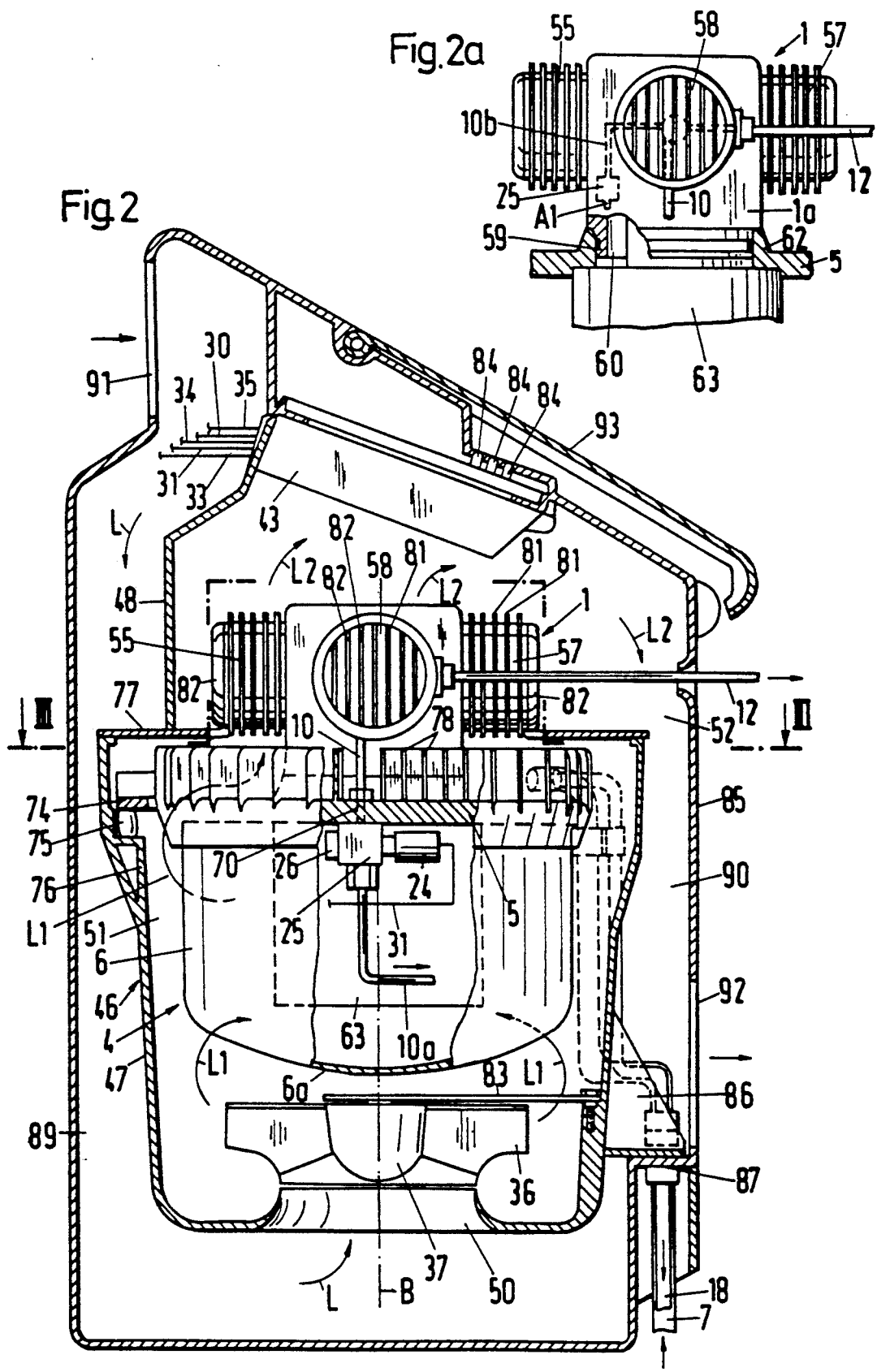

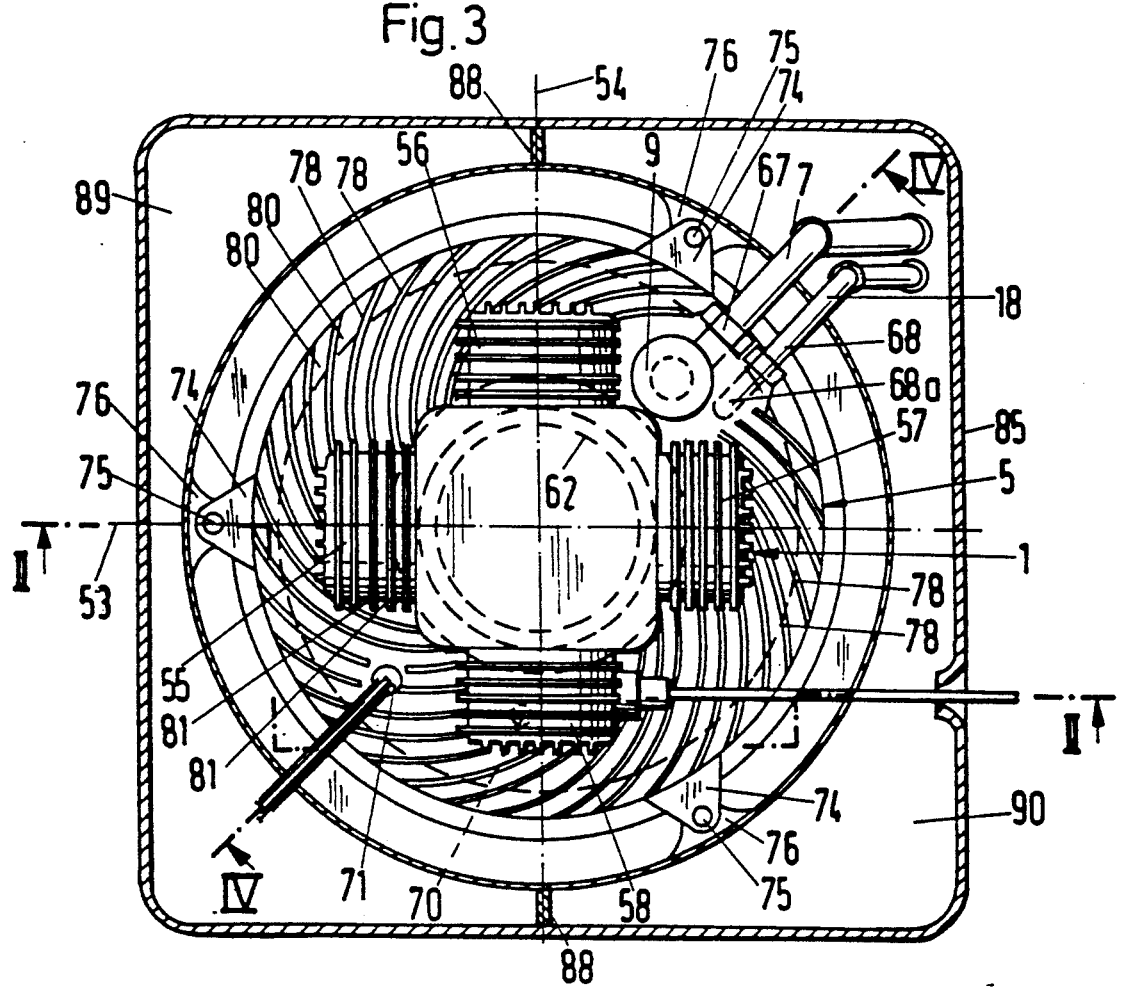

DEVICE FOR REFUELING A GASEOUS FUEL TANK

BACKGROUND OF THE INVENTION

The invention relates to an appliance for refuelling a gas fuel tank, having a compressor which can be driven via an electric motor, the suction side of which can be connected via a suction line provided with an inlet valve to a source of the gas fuel, in particular a natural gas line. The pressure side of the compressor can be connected to an intake line which can be coupled with the gas fuel tank to be refuelled, and is connected with an outlet line leading out of the pressurized tank via control and monitoring elements, which contain a relief valve disposed in a pressure chamber of a pressurized tank and a safety valve which can be set at a predetermined opening pressure.

A device of this type known from European Patent Application 0 300 222, has a compressor with a charging pressure which can be influenced via a control appliance as a function of the ambient temperature. The compressor and the motor are disposed next to the pressurized tank, which is divided by a partition into a fitting chamber connected with the pressure side of the compressor and a buffer chamber connected with the suction side of the compressor. The fitting chamber contains the inlet valve, the relief valve, a pressure control valve and further fittings, with it being possible to form the inlet valve and the relief valve by a common switching device. The buffer chamber is connected via connecting ducts constructed in the partition with the outlet sides of the inlet valve and of the relief valve and can be connected to the fitting chamber via a safety valve, which can be set at a relatively low opening pressure, e.g. 2 to 3 bar, to which chamber the outlet line is connected. When a predetermined charging pressure adapted to the ambient temperature is reached, which may be 100 to 200 bar, for example, with the known device the motor of the compressor is switched off via the control appliance and the relief valve is opened, with the amount of compressed gas fuel remaining in the compressor and in the intake line being guided into the buffer chamber, and when the pressure limited by the safety valve is exceeded, into the fitting chamber, and is discharged from said fitting chamber, decelerated by a throttle point, via the outlet line. Correspondingly, if a maximum value of the charging pressure set at the pressure control valve is exceeded, the amount of gas is guided away via the outlet line into the fitting chamber.

The known device requires a relatively large amount of space for the units to be arranged next to one another and to be connected to one another and that the design of the pressurized tank comprising two pressure-tight, explosion-proof tank parts is relatively lavish from the constructional viewpoint, with the partition constructed as a connecting part, especially as a distributor block.

SUMMARY OF THE INVENTION

The object of the invention is to provide a refueling device of the aforementioned type having a compact design, which has been developed further in this respect in particular, and in which the compressor, the motor, the pressurized tank and the necessary control and monitoring components can be combined to create a structural unit which can be transported and is simple to install as a single unit and at low cost, and which with a simplified pressurized tank guarantees at least the same operational safety as the known device.

This object is achieved according to the invention in that the suction side of the compressor and the suction line are connected to the pressure chamber of the pressurized tank containing the relief valve and the safety valve, in that the outlet line is connected via the safety valve to this pressure chamber, and in that a part of the pressurized tank is constructed as a load-bearing part for a housing part of the compressor which can be mounted thereon.

With the design of the invention it is possible to achieve a space-saving arrangement of the compressor and the pressurized tank, which requires few, short connecting lines. It is also possible to achieve a more simple construction of the pressurized tank, which only has a single pressure chamber sealed with respect to the surroundings and which is simultaneously used as a load-bearing mounting for the compressor. The present invention reduces the number of outer sealing sites to be sealed from the surroundings in comparison with previous devices, so that a corresponding increase in operating safety is guaranteed. In the event of a leakage at the control and monitoring elements disposed in the single pressure chamber and also when the relief valve or a corresponding safety element responds, the gas fuel flowing out is retained in the pressure chamber, sucked in by the compressor and is not discharged into the outlet line until the opening pressure set at the safety valve is exceeded. Thus it can be ensured that no gas fuel flows into the surroundings during normal operation by giving the pressurized tank appropriate dimensions and by the opening pressure of the safety valve being set at an appropriate level.

One aspect of the present invention provides that the support for the pressurized tank has an aperture that is sealed with respect to the compressor housing which renders the construction of the device compact and advantageously eliminates the need for a seal arrangement for the rotating drive shaft. In particular this design enables the device to be easily assembled and dismantled, with components which can be assembled as modular units, with it being possible to detachably couple the rotor of the motor with the drive shaft of the compressor or to connect it securely thereto.

The pressurized tank containing the control and monitoring elements may simultaneously be used as a housing for the motor, as a result of which the external dimensions of the appliance can correspondingly be reduced. The rotor of the motor in particular can be simply introduced into the stator by placing the compressor on the support for the pressurized tank.

Another aspect of the present invention places the control appliance outside the pressurized tank and provides the support for the pressurized tank with connections for the suction line, the outside line and a relief line to the relief valve. This arrangement provides easy access to the control appliance and the branch circuit connections, which can be mounted in a narrow space, which is easily accessible for maintenance and inspection. Further, non- load-bearing parts of the pressurized tank are of a simple construction, without any connections, so that they can withstand the maximum pressure in the pressurized tank. The pressurized tank can be designed to house all or only some of the control and monitoring elements.

A base part or a cover of the pressurized tank may be constructed as a load-bearing support.

BRIEF DESCRIPTION OF THE DRAWINGS

FIG. 1 is a front elevational view, in section, of a refueling device constructed in accordance with the present invention;

FIG. 2 is a side elevational view, in section, of the refueling device shown in FIG. 1 and is taken on line II—II of FIG. 3;

FIG. 2a is a fragmentary view, partially in section, similar to FIG. 2 and illustrates another embodiment of the present invention;

FIG. 3 is a plan view, in section, of the refueling device shown in FIG. 1 and is taken on line III—III of FIG. 2;

FIG. 4 is a fragmentary, elevational view, in section, and is taken on line IV—IV of FIG. 3; and FIG. 5 is a bottom view, in section, and is taken on line V—V of FIG. 4.

DESCRIPTION OF THE PREFERRED EMBODIMENTS

The refueling appliance shown in FIG. 1 contains a compressor 1 having a drive shaft 2, which is coupled to an electrical motor 3. The motor 3 is disposed in a pressurized tank 4, which has a cover 5 and a wall part 6 having a base part 6a which can be attached thereto via a seal arrangement 29. The compressor 1, which can be designed as desired, is tightly mounted with a housing part 1a on the cover 5 and connected on the suction side to the pressurized tank 4, which can be connected via a suction line 7 to a source of a gas fuel, which in the example shown is a natural gas line 8. As shown, the suction-side connection of the compressor 1 can be formed by a suction part 7a, which is tightly connected to an aperture 19a provided in the cover 5. The pressure side of the compressor 1 is connected firstly via a relief line 10 with a switching device 21 disposed in the pressurized tank 4, which acts in one switching position as a relief valve, and secondly can be connected via an intake line 12 to a gas fuel tank 13 to be refueled, which in the example shown can be designed as a fuel tank of a vehicle, not shown.

The suction line 7, which as shown may include a manually operable shut-off device 14, for example, and a filter 9 to separate impurities contained in the natural gas, if necessary, is connected via a one-way valve 15 to the switching device 21, which in another switching position operates as an inlet valve. To monitor the inlet pressure of the gas fuel, a differential pressure switch 17 is provided, which can be permanently set at a predetermined minimum pressure in the suction line 7, and the first inlet of which is connected to suction line 7 and the second inlet of which is connected to an outlet line 18 leading out of the pressurized tank 4, which upstream from the differential pressure switch 17 is provided with a safety valve 20, which can be set to a predetermined opening pressure. The outlet line 18 is guided out of the direct vicinity of the refueling device, e.g. via a roof covering the device.

The one-way valve 15 may be integrated in the switching device 21, a 3/2 directional control valve as shown in the drawings, which comprises a first inlet which can be connected to suction line 7, a second inlet which can be connected to relief line 10 and an outlet A opening into the interior of the pressurized tank 4. The switching device 21 can be adjusted via a control element 22, e.g. a servomotor, or, as shown in FIG. 1, an electromagnet, between an inlet position, in which the suction line 7 is connected to the outlet A and the relief line 10 is shut, and a relief position shown in FIG. 1, in which the relief line 10 is connected with outlet A and the suction line 7 is shut. A corresponding switching device, which is not the subject matter of the present invention, is known, for example from Swiss Patent Specification 675 459.

Inside the pressurized tank the relief line 10 is provided with a high pressure sensor 24 and a pressure control valve 25, which can be set at a predetermined maximum pressure of the compressed gas fuel, and which, as shown in FIG. 1, may have an outlet A1 opening into the interior of the pressurized tank 4 and closed by a rupture disc 26. The intake line 12 is provided with shut-off means, which as shown may contain inter alia a manually operable shut-off device 28 and/or a coupling which shuts off on the side of the compressor. A one-way valve 27 prevents the return flow of gas fuel into the intake line 12.

The differential pressure switch 17 and the high pressure sensor 24 are connected via electrical signal lines 30 and 31 respectively to a control appliance 32, which is connected via a control line 34 with the control element 22 of the switching device 21, and via further electrical lines 33 and 35 with the motor 3 and a motor 37 of a fan 36 respectively, which is disposed outside the pressurized tank 4 in the example shown. The compressor 1, the motor 3 and the cover 5 are provided with temperature sensors T, which are connected via a signal line 38 or 40 or 41 respectively with the control appliance 32. The control appliance 32 is also connected via a signal line 42 to a temperature sensor T1 determining the ambient temperature and as shown is housed in a switch unit 43, which can be connected via an electric line 44 to an electricity supply (not shown).

As shown, the switch unit 43 may be disposed outside the pressurized tank 4, in a housing 46 used to convey the air, which has a lower part 47 surrounding the wall part 6 and the base part 6a and an upper part 48 surrounding the cover 5 and the compressor 1. In its base part the lower part 47 is provided with an inlet aperture 50, to which the fan 36 is associated. Cooling air is sucked by the fan 36 into the housing 46, guided through an annulus 51 formed between the wall part 6 and the side wall of the housing 46 towards the compressor 1 and discharged from the housing 46 through an outlet aperture 52 provided in the upper part 48.

The refueling device is put into operation via switch unit 43, which can be operated, for example, by a key, whereby the switching device 21 is moved via the control appliance 32 out of the switching position shown into the flow position associated with suction line 7 and, as is known, the motor 3 is started, as described, for example, in European Patent Application 0 300 222 mentioned at the beginning. Accordingly the natural gas supplied from the natural gas line 8 with a pressure of 20 mbar, for example, is compressed by the compressor 1 to a predetermined charging pressure and supplied to the gas fuel tank 13 via intake line 12, with the workable charging pressure being limited via control appliance 32 as a function of control signals of the temperature sensor T1 and of the high pressure sensor 24 to a value corresponding to the respective ambient temperature. A maximum value of the charging pressure, which may be 230 bar, for example, can be set by the pressure control valve 25.

With the design shown, the gas fuel supplied from the suction line 7 is conveyed through the outlet A of the switching device 21 into the pressurized tank 4 containing the fittings and the motor 3 and from there it is sucked in through the compressor 1. When the charging pressure of 100 bar to 200 bar, for example, which corresponds to the ambient temperature, is reached, the switching device 21 is moved via control appliance 32 into the shown flow position assigned to the relief line 10 and the motor 3 is switched off. Correspondingly the compressed gas fuel remaining in the compressor 1 and in the intake line 12 is released through the outlet A of the switching device 21 into the pressurized tank 4. In this case—or if the rupture disc 26 is destroyed and the compressed gas fuel discharges through outlet A1 into the pressurized tank 4 when the maximum value of the charging pressure set at the pressure control valve 25 is exceeded—a pressure of 2 to 3 bar, for example, limited by safety valve 20 is built up therein. When this pressure is exceeded, safety valve 20 is opened and a corresponding amount of gas fuel is discharged to the outside through outlet line 18, which can be designed with a relatively large diameter and which guarantees rapid decompression.

In the embodiment described the pressurized tank 4 may be designed for a relatively low internal pressure, which is not substantially higher than the opening pressure set at the safety valve 20. Accordingly the pressurized tank 4 may be designed in a relatively light, simple style, which in particular requires relatively few flow gates which are easy to seal.

As is evident from European Patent Application 0 300 222 mentioned at the beginning, individual fittings which can be actuated separately—inlet valve, relief valve, non-return valve—may be provided instead of the switching device 21. According to an embodiment which is not shown, the low pressure fittings, e.g. the non-return valve 15, an inlet valve and the differential pressure switch, may also be disposed outside the pressurized tank 4, which then only contains the fittings subject to the highest pressures—a relief valve and pressure control valve 25—and also safety valve 20.

The compressor may be designed as a two-stage or a multi-stage reciprocating compressor, or as a four-stage reciprocating compressor corresponding to the objective representation of the refueling appliance shown in FIGS. 2 to 5, which has two cylinders 55 and 57 disposed opposite one another on a common horizontal axis 53, and also two cylinders 56 and 58 offset by 90° thereto and disposed opposite one another on a common horizontal axis 54, in which pistons (not shown) are guided. Each of the piston pairs disposed on the same axis 53 or 54 may be coupled, as known, via a drive arrangement connecting their piston rods with the vertical drive shaft 2 constructed as a crank shaft and penetrating a central crank chamber 60, with it being possible to construct the first and the second compression stage respectively in the cylinders 55 and 56 and the third and the fourth compression stage respectively in cylinders 57 and 58. A corresponding compressor, the design of which is not the subject matter of the present invention, is known from European Patent Application 0 389 414, for example. The natural gas introduced into the crank chamber 60 with a pressure of 20 mbar, for example, may be sucked into the cylinder 55, e.g. through a suction port provided in the piston, compressed at a pressure of 5 bar, for example, and successively compressed in cylinder 56 to a pressure of 60 bar, for example, and in cylinder 58 at a final pressure of 200 bar, for example, and supplied to the gas fuel tank 13 via intake line 12.

As can be seen from FIG. 4 in particular, the compressor 1 is constructed with a housing part 1a, which can be placed on the cover 5 of the pressurized tank 4 and is open towards its interior, and which has a cylindrical shoulder 61 which can be inserted into aperture 19 of the cover 5. The cover 5 of the cylindrical pressurized tank 4 in the design shown is designed with a central collar part 62 surrounding aperture 19, by which the housing part 1a is supported and the shoulder 61 is guided via a seal arrangement 59. The motor 3 having a vertical axis of rotation is disposed in a mounting 63 attached to the cover 5. The motor 3 contains a stator part 64 which can be attached to the mounting 63 and a rotor 65, which can be attached to the drive shaft 2 of the compressor 1 via a detachable coupling or which, as shown in FIG. 4, is connected with the drive shaft 2 to form a mounting unit which can be introduced into the stator part 63 through aperture 19. As shown in FIG. 4, the rotor 65 can be assembled with the compressor 1 and it can be simply fitted by placing and inserting the housing part 1a on or in the collar part 62 respectively and can also be easily dismantled by removing the compressor 1.

The differential pressure switch 17, the safety valve 20, the switching device 21, the high pressure sensor 24 and the pressure control valve 25 are disposed in the annulus formed between the mounting 63 and the wall part 6 of the pressurized tank 4. Connections 67 and 68 for the suction line 7 and the outlet line 18 respectively and also connections 70 and 71 for the relief line 10 and the electric lines 30, 31, 33, 34 and 35 are provided in the cover 5. The connection 67 opens into a bore 72 constructed in the cover 5, which is used to house the filter 9 and which is connected to the non-return valve 15 of the switching device 21 via a connection 67a. The connection 68 is connected to the differential pressure switch 17 and the safety valve 20 via a corresponding connection 68a, but this is not shown further. The differential pressure switch 17 and the safety valve 20 can be connected as shown with the switching device 21, which can be attached to the cover 5, so as to form a mounting unit. The relief line 10 connected to the cylinder 58 is connected via connection 70 to the pressure control valve 25, which is combined with the high pressure sensor 24 to form a mounting unit which can be attached to the cover 5 and is connected via a line section 10a to the inlet of the switching device 21.

According to another embodiment shown partially in FIG. 2a, the pressure control valve 25 may also be disposed outside the pressurized tank 4, inside the compressor housing connected in a tight manner thereto and connected to a duct 10a connecting the pressure side of the compressor 1 to its suction side. With this design, which with the exception of the arrangement of the pressure control valve 25 corresponds to the design shown in FIGS. 2 to 5, the duct 10b is connected to the pressure chamber of the cylinder 58 and closed by the pressure control valve 25, the outlet A1 of which opens into the crank chamber 60 open towards the pressurized tank 4. If the pressure set at the pressure control valve 25 is exceeded, the compressed gas fuel leaving through outlet A1 is correspondingly relieved and again sucked in by the compressor 1 and discharged via the outlet line 18 when the safety valve 20, which is not shown in FIG. 2a, responds. The pressure chamber of the cylinder 58 can also be connected as described via the relief line 10 with the control and monitoring elements—high pressure sensor 24 and switching device 21—which are disposed in the pressurized tank 4 and not shown in FIG. 2a, and also via intake line 12 with the gas fuel tank 13. A further simplification of the construction of the refueling device can be achieved with this design, especially as regards the connections to be provided in the pressurized tank 4.

As shown by the representation in FIG. 2 and FIG. 3, the cover 5 of the pressurized tank 4 is supported via three brackets 74 and rubber bearings 75 distributed over its periphery on support parts 76 of the housing 46 used for air conduction. The support parts 76 are constructed on the lower part 47, which encloses the wall part 6 and the cover 5 at a relatively small radial distance therefrom and which is connected to a deflector plate 77 disposed above the cover 5 and covering the annulus 51 and the edge part of the cover 5. The cooling air flowing through the annulus 51 from the bottom upwards may be deflected by deflector plate 77 along the cover 5 towards the compressor 1 and be discharged upwards along the cylinders 55, 56, 57 and 58. As a result the air flow can be favorably guided so as to cool the pressurized tank 4 and the compressor 1.

The cover 5 is designed with fins 78, which, when seen in the plan view in FIG. 3, extend from the outer periphery in a helicoidal curve in the anti-clockwise direction towards the collar part 62, and they limit air ducts 80, which are covered by the deflector wall 77 in the cover 5 and are open at the top in the region of the cylinders 55, 57, 57, 58. The cooling air conveyed by the fan 36 into the annulus 51, which is guided as shown by arrows L1 helicoidally around the wall part 6 towards the deflector wall 77, reaches into the ducts 80 in the peripheral region of the cover 5 and is discharged upwards through them towards the housing part 1a and also at right angles to the cylinders 55, 56, 57 and 58, at least roughly in the direction of the longitudinal axis B of the pressure vessel 4. Cylinders 55, 56, 57 and 58 can be provided with annular fins 81 and with fins 82 extending vertically over their front surfaces, which in the vertical direction limit flow paths and thus guarantee a good cooling action. As can be seen from FIG. 3 in particular, fins 78 of cover 5 extend in an involute curve, with ducts 80 being able to have a substantially constant width over their length, so that the cooling air may be guided in a manner favorable to the flow and the cover 5 and the compressor 1 can be effectively cooled. However a design in which adequate cooling can be achieved by fins which are easy to produce, extend in a straight line, and are disposed in a star shape, for example, is also possible.

The fan 36 is supported in the bottom part 47 of the housing 46 via a mounting, which may contain three brackets 83 connected to the motor 37. The switch unit 43 in the form of a panel, which may be provided with pressure-sensitive switches 84 to operate the refueling appliance, may be housed in a mounting region which is provided in the upper part 48 of the housing 46 and is easily accessible for inspection, maintenance and service. As shown in the representation in FIGS. 2 and 3, the housing 46 surrounding the pressurized tank 4 and the compressor 1 may be disposed in a further, outer housing 85, which may be designed with a square cross section, as shown in FIG. 3. The inner housing 46 may be placed via several, e.g. three, brackets 86 on corresponding support parts 87 of the housing 85. The outer housing 85 may be connected to the inner housing 46 via partitions 88, which divide the space formed between housings 85 and 46 into two partial chambers 89 and 90, through which flow is possible and which are only connected to one another via the lower inlet aperture 50 and the aperture constructed in the deflector wall 77. Partial chamber 89 may be connected to an inlet aperture 91 disposed at the upper end of the housing 85, and partial chamber 90 may be connected to an outlet aperture 92 disposed at the lower end of the housing 85. The outer housing 85 may also be provided with a sealable cover 93, by which the pressure switches 84 can be covered and protected from unauthorized operation.

During operation the cooling air is sucked in by the fan 36 as shown by arrows L through the inlet aperture 91 and the partial chamber 89, guided as shown by arrows L1 along the pressurized tank 4 into the upper part 48 of the inner housing 46 and conveyed as shown by arrows L2 out of housing 85 through partial chamber 90 and outlet aperture 92. Accordingly the cooling air is conveyed in the narrowest space and this also permits both the pressurized tank 4 and also the compressor 1 to be intensively cooled with the compact construction of the refueling device which can be achieved with the design specified by the invention. At the same time effective noise prevention can also be achieved with housings 46 and 85.

Numerous modified embodiments of the invention are possible. Thus, for example, the complete motor of the compressor can be attached to the inside of the cover 5 constructed as the load-bearing part and be connected to the drive shaft of the compressor via a known coupling arrangement disposed in the region of aperture 19. According to another embodiment, the compressor and the motor can be disposed inside the pressurized tank, as a result of which a further reduction in areas sealed with respect to the outside can be achieved. According to a further embodiment, the compressor can be disposed inside the pressurized tank and the motor can be disposed outside the pressurized tank. Moreover according to one embodiment the motor of the compressor can be mounted outside the pressurized tank, e.g. inside the housing part of the compressor attached to the outside of the cover 5 or of a corresponding load-bearing part, and it is possible to construct the pressurized tank—which is only designed for mounting the fittings, and if required only for the fittings exposed to the highest pressures—so that it is correspondingly small. In contrast to the designs shown, another part, e.g. a base part, of the pressurized tank may also be constructed as a load-bearing part for the compressor and/or the motor. A design is also possible in which guide elements similar to guide vanes and corresponding to the fins 78 are provided for the cooling air in the housing 46, especially on the deflector wall 77.

We claim:

1. An appliance for refueling a gas fuel tank (13), having a compressor (1) which can be driven via an electric motor (3), the suction side of which can be connected via a suction line (7) provided with an inlet valve to a source of the gas fuel, more especially a natural gas line (8), and the pressure side of which can be connected to an intake line (12), which can be coupled with the gas fuel tank (13) to be refueled, and is connected to an outlet line (18) leading out of the pressurized tank (4) via control and monitoring elements, which contain a relief valve disposed in a pressure chamber of a pressurized tank (4) and a safety valve (20), which can be set at a predetermined opening pressure, characterized in that the suction side of the compressor (1) and the suction line (7) are connected to the pressure chamber of the pressurized tank (4) containing the relief valve and the safety valve (20), in that the outlet line 18) is connected via the safety valve (20) to this pressure chamber, and in that a part of the pressure chamber (4) is constructed as a support for a housing part (1a) of the compressor (1) which can be mounted thereon.

2. An appliance according to claim 1, characterized in that the support has an aperture (19) which can be sealed with respect to the housing part (1a) of the compressor (1), and in that the motor (3) is disposed on the side of the support remote from the compressor (1) and can be coupled to the compressor (1) via a drive shaft (2) penetrating this aperture (19).

3. An appliance according to claim 1, characterised in that the compressor (1) is disposed on the outside of the support, in that the stator (64) of the motor is fixed to the inside of the support, and in that the rotor (65) of the motor 3) is connected to the drive shaft (2) of the compressor (1) to form a mounting unit which can be inserted through aperture (19) into the stator (64).

4. An appliance according to claim 1, having control and monitoring components, which are connected via electric lines (30, 31, 33, 34, 40, 41) to a control appliance (32), characterized in that the control appliance (32) is disposed outside the pressurized tank (34), and in that the support is designed with connections (67, 68, 70 and 71) for the suction line (7), the outlet line (18) and a relief line (10) leading to the relief valve and also for the electrical lines (30, 31, 33, 34, 40, 41).

5. An appliance according to claim 1, having an approximately cylindrical pressurized tank (4), characterized in that the support is formed by a cover (5) of the pressurized tank (4) and in that the pressurized tank (4) and the compressor (1) are disposed with an approximately vertical longitudinal axis (B) or vertical drive shaft (2) respectively and are lodged in a housing (46) surrounding them which is suitable for air conduction, and which is provided with an inlet aperture (50) at the lower end and with an outlet aperture (52) for cooling air at the upper end and which, at least with the pressurized tank (4), limits an annular duct (51), through which the cooling air flows and which is open towards the compressor (1) and the outlet aperture (52).

6. An appliance according to claim 5, characterized in that in the region of the inlet aperture (50) is disposed a fan (36) with an impeller which can be driven around a vertical axis, and in that in the region of the cover (5) of the pressurized tank (4) guide means are permitted to deflect the cooling air flowing around the pressurized tank (4) towards the housing part (1a) of the compressor (1) connected to the cover (5).

7. An appliance according to claim 6, characterized in that the housing (46) is designed with a deflector plate (77) like an annular disc which is disposed at an axial distance from the cover (5) of the pressurized tank (4) and which covers its outer edge part, and in that guide elements similar to guide blades are provided as guide means for the cooling air.

8. An appliance according to claim 7, characterized in that the guide elements are formed by fins (78) which are constructed on the cover (5) and extend from its peripheral region towards aperture (19), and which are involutely curved.

9. An appliance according to claim 5, characterized in that the housing (46) surrounding the pressurized tank (4) and the compressor (1) is disposed inside an outer housing (85), which contains an inlet aperture (91) and an outlet aperture (92) for the cooling air and which with the inner housing limits two partial chambers (89 and 90) separated by partitions (88) and through which cooling air can successively flow, one of which (89) connects the two inlet apertures (50 and 91) and the other of which (96) connects the two outlet apertures (52 and 92) of the housings (46 and 85).

10. An appliance according to claim 9, characterized in that the control appliance (32) is disposed between the inner housing (46) and the outer housing (85).

11. An appliance according to claim 1, having a pressure control valve (25) which is connected to the pressure side of the compressor (1) and can be set at a predetermined maximum pressure of the gas fuel, characterized in that the pressure control valve (25) is disposed in the housing of the compressor (1) and is connected to a duct (10b) connecting the pressure side and the suction side of the compressor (1).

12. A device according to claim 1 including a duct fluidly connecting the pressure side of the compressor with the suction side and a pressure control valve preventing fluid communication through the duct until the pressure has reached a predetermined value.

13. A gaseous fuel refueling system for filling a gas tank with gaseous fuel under pressure, the system comprising a self-supporting pressure tank defining a pressure chamber and including means for connecting the chamber to a source of gaseous fuel, a vent communicating the chamber with an exterior of the tank, and gas flow control means including a relief valve and a safety valve disposed within the chamber; a compressor unit comprising a compressor and an electric motor for driving the compressor, the compressor including a suction side and a suction line fluidly connecting the suction side with the pressure chamber and therewith with the fuel source, and a pressure side in fluid communication with a gaseous fuel intake line for the gas tank and the relief valve for selectively communicating the pressure side with the pressure chamber and thereby with the vent when the safety valve is in its open position; whereby, upon activation of the electric motor, the compressor draws gaseous fuel from the chamber and, in response to a predetermined condition, compressed gaseous fuel discharged at the pressure side of the compressor can be vented via the gas flow control means, the pressure chamber and the vent to the exterior of the tank; the tank further including means for fully supporting the compressor.

14. A device according to claim 13 wherein the compressor unit includes a shaft connected to the motor and the compressor and axially spacing them apart, and wherein the means for supporting comprises means rotatably mounting the shaft to the tank, positioning the motor in the chamber and the compressor on the exterior of the tank, and sealing the pressure chamber from the exterior.

15. A device according to claim 14 wherein the motor includes a stator secured to the means for supporting and located in the chamber and a rotor, the rotor and the compressor being secured to the shaft to form a shaft unit adapted to be operatively coupled with the stator to form the compressor unit by moving the rotor and therewith the shaft and the compressor in an axial direction from the exterior of the tank until the rotor is in registration with the stator.

16. A device according to claim 13 including an electronic control unit for sensing conditions in the chamber and for operating the flow control means, an electronic control appliance mounted on an exterior of the tank, and electric leads operatively coupling the control unit with the electronic control appliance; and wherein the means for supporting defines means for fluidly connecting the chamber with the suction line, the pressure side and the vent means for passing the electric leads from the chamber to the exterior.

17. A device according to claim 13 wherein the tank includes an upwardly open, cylindrical main portion, and a cover covering the main portion and wherein the cover defines the support.

18. A device according to claim 17 wherein the compressor is disposed on an exterior of the tank, and including an inner housing mounting the tank so that an axis of the electric motor is substantially vertically oriented, the inner housing including means for inducing a controlled flow of cooling air about portions of the exterior of the tank and flow channeling means between the tank and the inner housing directing the induced cooling air flow towards cooling surfaces of the compressor.

19. A device according to claim 18 wherein the flow channeling means includes an annular disc disposed between the tank cover and the inner housing having spirally-shaped blades extending from a vicinity of an annular space between the tank and the inner housing to a vicinity of the compressor along an involutely curved path.

20. A device according to claim 18 wherein the means for inducing a controlled flow includes an inlet to an interior of the inner housing proximate a lower end thereof, and including an outer housing surrounding the inner housing, means mounting the inner housing to the outer housing to define an annular space between them in fluid communication with the inlet of the inner housing, and means dividing the annular space into first and second portions which are sealed from each other and which fluidly connect the inlet with only one of the two portions, an intake opening communicating said one of the two portions with the exterior of the outer housing, and an outlet in the outer housing communicating the other portion with the exterior of the outer housing so that cooling air can flow through the intake opening, the first portion, the inlet, the other portion and the outlet to the exterior again.

* * * * *